US012771199B2

(12) United States Patent
Takahashi et al.

(10) Patent No.: US 12,771,199 B2
(45) Date of Patent: Oct. 20, 2026

(54) ARMATURE AND ROTATING ELECTRIC MACHINE

(71) Applicant: DENSO CORPORATION, Kariya-city (JP)

(72) Inventors: Masayuki Takahashi, Kariya-city (JP); Masayuki Echizen, Kariya-city (JP); Ryo Mitani, Kariya-city (JP)

(73) Assignee: DENSO CORPORATION, Kariya (JP)

(*) Notice: Subject to any disclaimer, the term of this patent is extended or adjusted under 35 U.S.C. 154(b) by 167 days.

(21) Appl. No.: 18/918,363

(22) Filed: Oct. 17, 2024

(65) Prior Publication Data

US 2025/0038600 A1 Jan. 30, 2025

Related U.S. Application Data

(63) Continuation of application No. PCT/JP2023/006885, filed on Feb. 24, 2023.

(30) Foreign Application Priority Data

Apr. 21, 2022 (JP) ................................. 2022-070262

(51) Int. Cl.
*H02K 3/28* (2006.01)
*H02K 3/32* (2006.01)

(52) U.S. Cl.
CPC ................. *H02K 3/28* (2013.01); *H02K 3/32* (2013.01); *H02K 2203/06* (2013.01)

(58) Field of Classification Search
CPC ........ H02K 3/28; H02K 3/32; H02K 2203/06; H02K 3/522; H02K 3/04; H02K 3/50; H02K 2203/09
USPC .................................................... 310/195, 71
See application file for complete search history.

(56) References Cited

U.S. PATENT DOCUMENTS

| | | | | |
|---|---|---|---|---|
| 2006/0208605 | A1 | 9/2006 | Aoyama et al. | |
| 2017/0310180 | A1 | 10/2017 | Seo et al. | |
| 2019/0348873 | A1 | 11/2019 | Katsuragi et al. | |
| 2025/0038600 | A1* | 1/2025 | Takahashi | H02K 3/28 |

FOREIGN PATENT DOCUMENTS

| | | | | |
|---|---|---|---|---|
| CN | 115702539 | | * | 2/2023 |
| JP | 2006-271188 | A | | 10/2006 |
| JP | 2020096465 | A | * | 6/2020 |
| JP | 2021-151093 | A | | 9/2021 |

* cited by examiner

*Primary Examiner* — Ahmed Elnakib
(74) *Attorney, Agent, or Firm* — Oliff PLC

(57) ABSTRACT

A stator includes a stator core, a plurality of coils, a second terminal having a crimp part, a first lead wire, and a second lead wire. The first lead wire is formed of a part of a winding that forms a specific coil among the plurality of coils. Moreover, the first lead wire is routed from the specific coil to the crimp part and has a connection portion connected to the crimp part. The second lead wire is formed of another part of the winding that forms the specific coil. Moreover, the second lead wire is routed from the specific coil toward an opposite side to the first lead wire and connects between the specific coil and another one of the plurality of coils.

5 Claims, 15 Drawing Sheets

ARMATURE AND ROTATING ELECTRIC MACHINE

CROSS-REFERENCE TO RELATED APPLICATIONS

The present application is a continuation application of International Application No. PCT/JP2023/006885 filed on Feb. 24, 2023, which is based on and claims priority from Japanese Patent Application No. 2022-070262, filed on Apr. 21, 2022. The entire contents of these applications are incorporated by reference into the present application.

BACKGROUND

1 Technical Field

The present disclosure relates to armatures and rotating electric machines.

2 Description of Related Art

There is known a stator which is an armature constituting a part of a rotating electric machine (see, for example, Japanese Patent Application Publication No. JP 2021-151093 A). The stator includes a U-phase coil, a V-phase coil and a W-phase coil which are formed by windings. These coils extend in a circumferential direction of a stator core and have connection portions to which a U-phase electroconductive member, a V-phase electroconductive member and a W-phase electroconductive member are respectively connected. Each of the electroconductive members includes a hook that clamps a corresponding one of the connection portions in a radial direction of the stator core. With this configuration, it becomes unnecessary to lead out coil end portions from the respective coils in such a manner as to extend in an axial direction of the stator core; thus, it becomes possible to achieve reduction in the size of the stator in the axial direction.

SUMMARY

In the windings that form the coils, when portions of the windings led out from the coils make contact with each other, wear of the windings may occur at the contacting portions. However, the configuration of the stator known in the art has not taken this problem into consideration.

The present disclosure has been accomplished in view of the above problem.

According to a first aspect of the present disclosure, there is provided an armature comprising: an armature core having an annular part and a plurality of teeth protruding from the annular part toward a radial side thereof and spaced apart from one another in a circumferential direction; a plurality of coils formed of electroconductive windings wound around the respective teeth; a terminal formed of an electroconductive member and having a locking part arranged between a circumferentially-adjacent pair of the teeth; a first lead wire formed of a part of one of the windings which forms a specific coil among the plurality of coils, the first lead wire being routed from the specific coil to the locking part and having a connection portion connected to the locking part; and a second lead wire formed of another part of the one of the windings which forms the specific coil, the second lead wire being routed from the specific coil toward an opposite side to the first lead wire and connecting between the specific coil and another one of the plurality of coils.

According to a second aspect of the present disclosure, there is provided an armature comprising: an armature core having an annular part and a plurality of teeth protruding from the annular part toward a radial side thereof and spaced apart from one another in a circumferential direction; a plurality of coils formed of electroconductive windings wound around the respective teeth; a terminal formed of an electroconductive member and having a locking part arranged between a circumferentially-adjacent pair of the teeth; a first lead wire formed of a part of one of the windings which forms a specific coil among the plurality of coils, the first lead wire being routed from the specific coil to the locking part and having a connection portion connected to the locking part; a second lead wire formed of another part of the one of the windings which forms the specific coil, the second lead wire being routed from the specific coil to the first lead wire side and connecting between the specific coil and another one of the plurality of coils; and an insulator formed of an electrically-insulative material and mounted to the armature core, the insulator having a lead-wire contact portion against which at least one of the first and second lead wires abuts, thereby maintaining a state of the first and second lead wires being spaced apart from each other.

According to a third aspect of the present disclosure, there is provided a rotating electric machine comprising a stator and a rotor, wherein: one of the stator and the rotor includes the armature according to the first or second aspect of the present disclosure; and the other of the stator and the rotor has a magnet arranged to radially face the armature.

With the above configurations of the armatures according to the present disclosure, wear of those portions of the windings which are led out from the coils can be suppressed.

DESCRIPTION OF EMBODIMENTS

Figure 1:
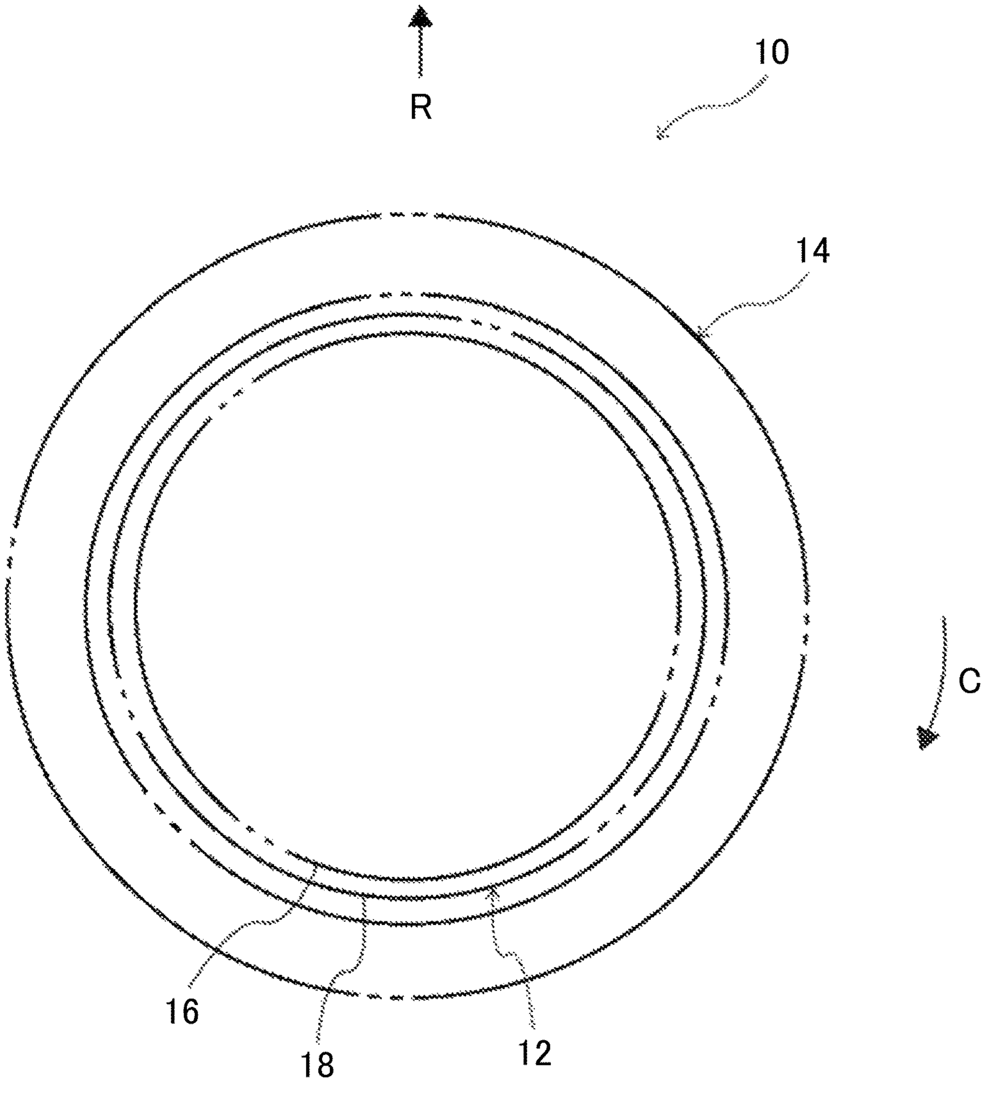
FIG. 1 is a schematic diagram of a motor according to a first embodiment as viewed in an axial direction.

A motor 10 according to a first embodiment of the present disclosure will be described with reference to FIGS. 1 to 11.

It should be noted that the arrows Z, R and C suitably shown in the drawings respectively indicate a first side in a rotation axial direction, an outer side in a rotation radial direction and a first side in a rotation circumferential direction of a rotor 12 that will be described later. Moreover, it also should be noted that: the first axial side and a second axial side are defined only for the sake of convenience of explanation; and the first axial side may alternatively be defined as the second axial side and the second axial side may alternatively be defined as the first axial side. Similarly, it also should be noted that: the first circumferential side and a second circumferential side are defined only for the sake of convenience of explanation; and the first circumferential side may alternatively be defined as the second circumferential side and the second circumferential side may alternatively be defined as the first circumferential side. Furthermore, it also should be noted that in the case of merely indicating the axial direction, the radial direction and the circumferential direction, unless specified otherwise, the arrows Z, R and C respectively indicate the rotation axial direction, the rotation radial direction and the rotation circumferential direction of the rotor 12. In addition, it should be noted that the motor 10 according to the present embodiment and motors according to embodiments to be described later are examples of rotating electric machines.

As shown in FIG. 1, the motor 10 according to the present embodiment is configured as an inner rotor type brushless motor. The motor 10 includes a stator 14 that serves as an armature, and the aforementioned rotor 12 that is arranged radially inside the stator 14.

The rotor 12 has a rotor core 16 fixed to a rotating shaft (not shown), and a magnet 18 fixed to a radially outer surface of the rotor core 16. The magnet 18 is a ring magnet that is formed in an annular shape. In the magnet 18, portions whose radially outer parts form N poles and portions whose radially outer parts form S poles are arranged alternately in the circumferential direction. In addition, the rotor 12 may alternatively have a plurality of magnets 18 fixed to the radially outer surface of the rotor core 16. In this case, those magnets 18 whose radially outer parts form N poles and those magnets 18 whose radially outer parts form S poles are arranged alternately in the circumferential direction.

Figure 2:
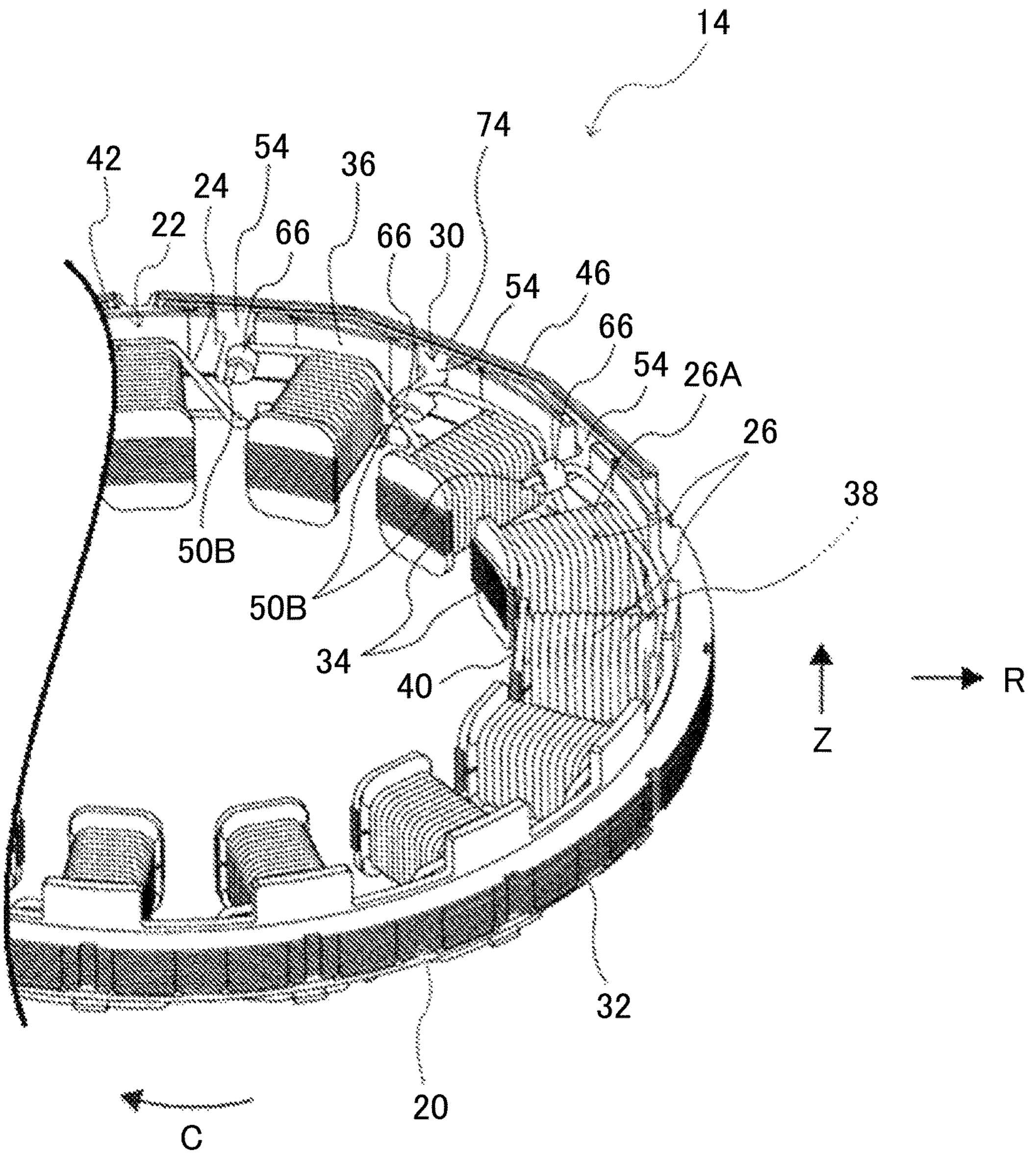
FIG. 2 is a perspective view of a stator of the motor.

As shown in FIG. 2, the stator 14 includes a stator core 20 that serves as an armature core, an insulator 22 mounted to the stator core 20, and a plurality of coils 26 formed of electroconductive windings 24 that are wound around the stator core 20. Moreover, as shown in FIGS. 2 and 3, the stator 14 also includes three first terminals 28 and one second terminal 30; to these terminals 28 and 30, there are connected end portions of the coils 26.

The stator core 20 is a laminated core formed by laminating core-forming sheets in the axial direction; each of the core-forming sheets is formed by blanking a steel sheet, which is a soft-magnetic material, into a predetermined shape. The stator core 20 has an annular part 32 and a plurality of teeth 34 protruding radially inward from the annular part 32. More particularly, as shown in FIG. 3, in the present embodiment, the stator core 20 has fifteen teeth 34 arranged at equal intervals in the circumferential direction.

Figure 3:
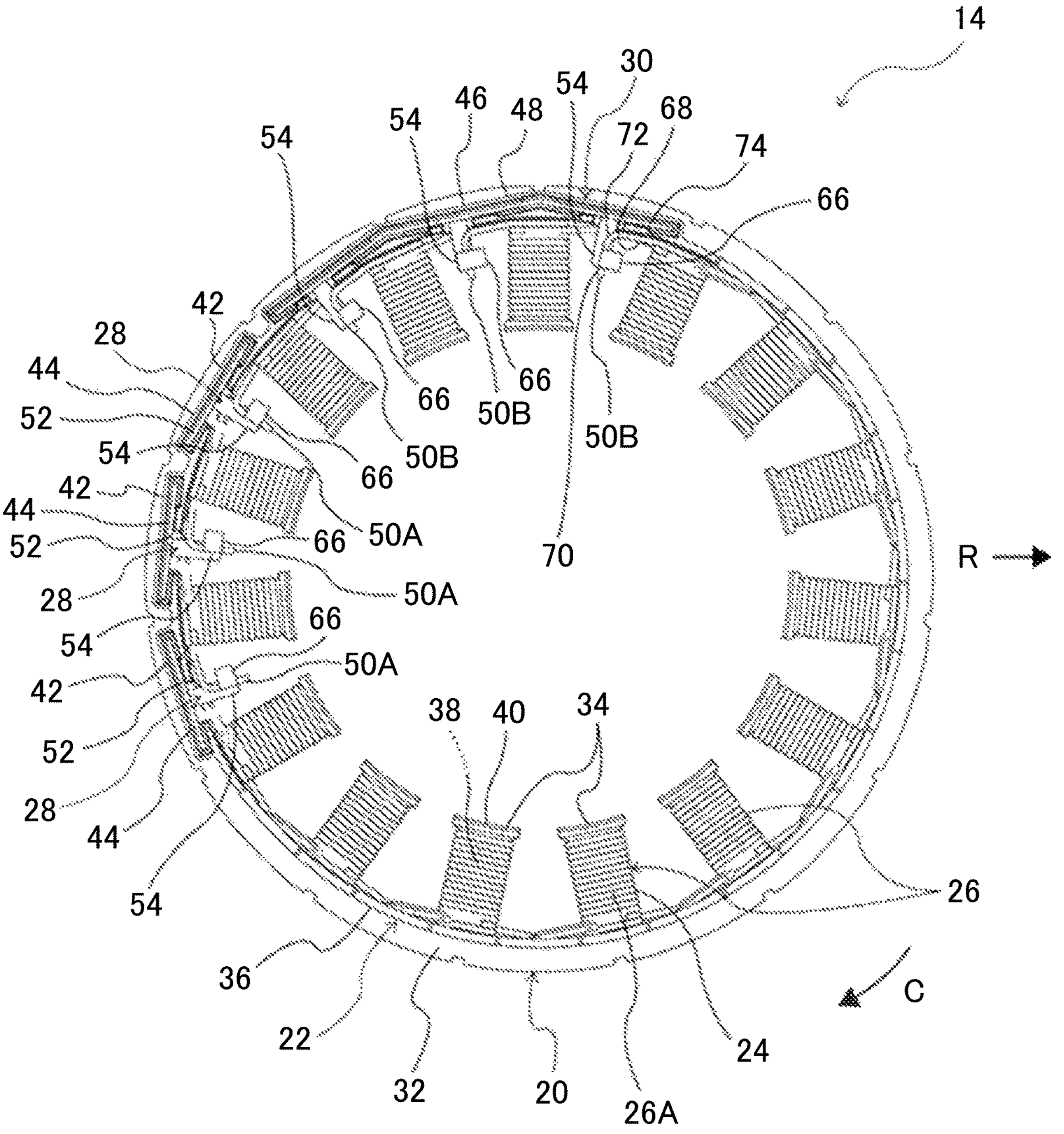
FIG. 3 is a plan view of the stator.

As shown in FIGS. 2 and 3, the insulator 22 is formed of a resin material which is an electrically-insulative material. The insulator 22 has an annular covering part 36 arranged along a radially inner surface of the annular part 32 of the stator core 20.

Moreover, the insulator 22 also has a plurality of tooth-covering parts 38 each extending radially inward from the annular covering part 36. The number of the tooth-covering parts 38 is equal to the number of the teeth 34 of the stator core 20. The tooth-covering parts 38 respectively cover those parts of the teeth 34 on which the coils 26 (to be described later) are formed.

Furthermore, the insulator 22 also has flange parts 40 each protruding from a radially inner end portion of a corresponding one of the tooth-covering parts 38 in the axial direction and toward the opposite side to the tooth 34 covered by the corresponding tooth-covering part 38. The coils 26, which will be described later, are wound around the corresponding tooth-covering parts 38 and located between the corresponding flange parts 40 and the annular covering part 36. In addition, in the present embodiment, the insulator 22 has an axially-bisected structure.

As shown in FIG. 3, the insulator 22 also has three first-terminal support parts 42 that respectively support the three first terminals 28 which will be described later. The three first-terminal support parts 42 are arranged along an end face of the annular part 32 of the stator core 20 on the first axial side. Moreover, for each of the first-terminal support parts 42, an end portion of the first-terminal support part 42 on the first circumferential side is located at the same circumferential position as that one of a circumferentially-adjacent pair of the teeth 34 which is located on the first circumferential side; and an end portion of the first-terminal support part 42 on the second circumferential side is located at the same circumferential position as the other of the circumferentially-adjacent pair of the teeth 34 which is located on the second circumferential side. Furthermore, a circumferentially central portion of the first-terminal support part 42 is located at a circumferentially intermediate position between the circumferentially-adjacent pair of the teeth 34. In the present embodiment, the three first-terminal support parts 42 are arranged in alignment with each other in the circumferential direction at positions corresponding to four circumferentially-adjacent teeth 34. Moreover, in each of the three first-terminal support parts 42, there is formed a first-terminal fitting portion 44. The first-terminal fitting portion 44 is shaped in a recess that is open on the first axial side.

The insulator 22 also has a second-terminal support part 46 that supports the second terminal 30 which will be described later. The second-terminal support part 46 is arranged along the end face of the annular part 32 of the stator core 20 on the first axial side. In the present embodiment, the second-terminal support part 46 is provided over a circumferential range corresponding to four circumferentially-adjacent teeth 34. Moreover, the second-terminal support part 46 is located on the first circumferential side of that one of the three first-terminal support parts 42 which is located furthest toward the first circumferential side. Furthermore, the second-terminal support part 46 is arranged circumferentially adjacent to that one of the three first-terminal support parts 42 which is located furthest toward the first circumferential side. Moreover, in the second-terminal support part 46, there is formed a second-terminal fitting portion 48. The second-terminal fitting portion 48 is shaped in a recess that is open on the first axial side. The detailed configuration of the second-terminal fitting portion 48 will be described later.

The coils 26 are formed of the windings 24 (such as copper wires) that are wound around the corresponding teeth 34 of the stator core 20 with the insulator 22 interposed therebetween. In the present embodiment, five U-phase coils 26, five V-phase coils 26 and five W-phase coils 26 are formed respectively around predetermined teeth 34. Moreover, the U-phase coils 26, the V-phase coils 26 and the W-phase coils 26 are arranged in this order in the circumferential direction. Furthermore, the five U-phase coils 26 are connected in series with each other; the five V-phase coils 26 are connected in series with each other; and the five W-phase coils 26 are connected in series with each other. In addition, the five U-phase coils 26, the five V-phase coils 26 and the five W-phase coils 26 are star-connected together.

Hereinafter, a first end part of the winding 24 that forms the five U-phase coils 26 will be referred to as a U-phase first terminal part 50A; and a second end part of the winding 24 that forms the five U-phase coils 26 will be referred to as a U-phase second terminal part 50B.

Similarly, a first end part of the winding 24 that forms the five V-phase coils 26 will be referred to as a V-phase first terminal part 50A; and a second end part of the winding 24 that forms the five V-phase coils 26 will be referred to as a V-phase second terminal part 50B.

Similarly, a first end part of the winding 24 that forms the five W-phase coils 26 will be referred to as a W-phase first terminal part 50A; and a second end part of the winding 24 that forms the five W-phase coils 26 will be referred to as a W-phase second terminal part 50B.

Figure 4:
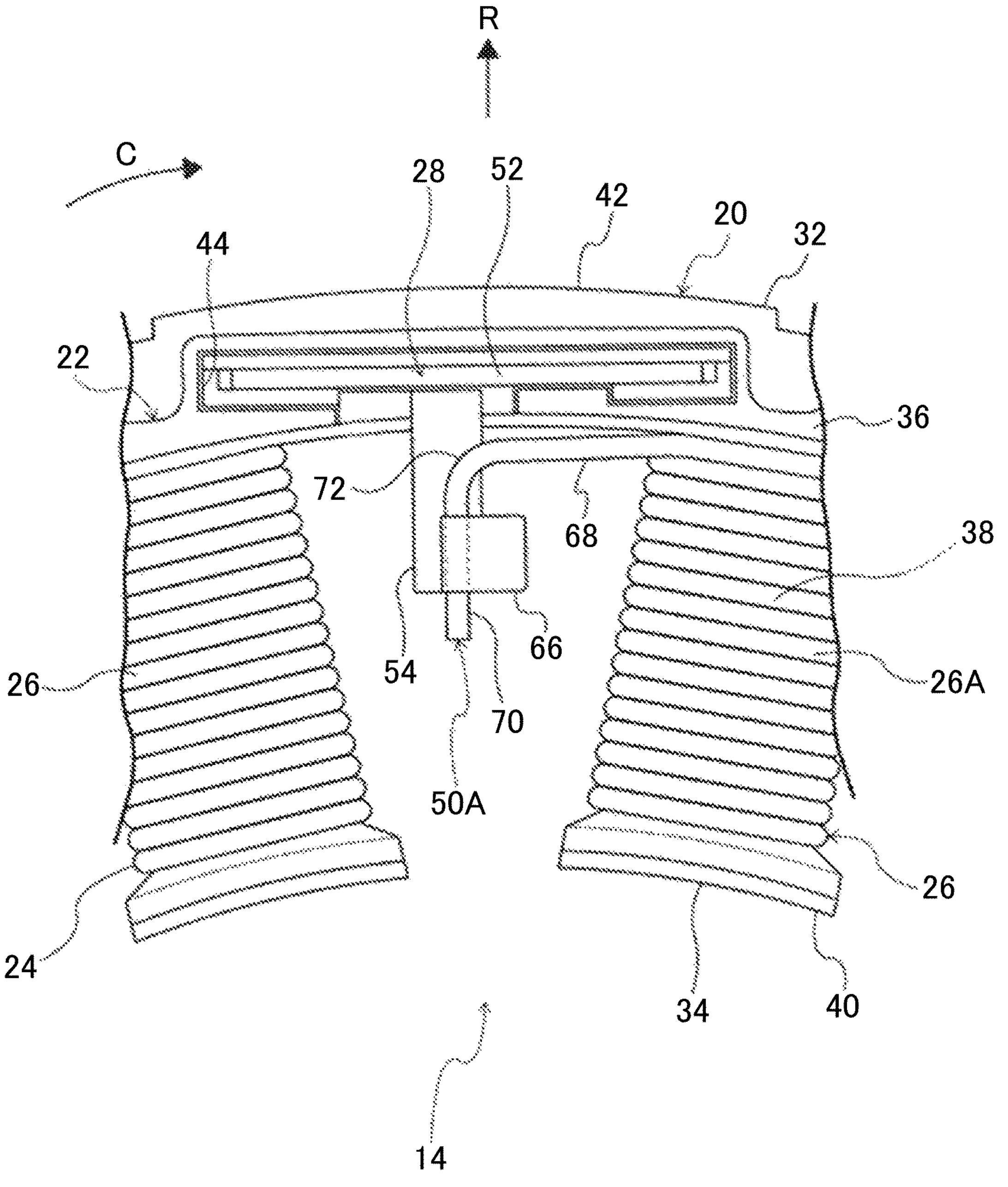
FIG. 4 is an enlarged plan view of part of the stator where a first terminal is provided.
Figure 5:
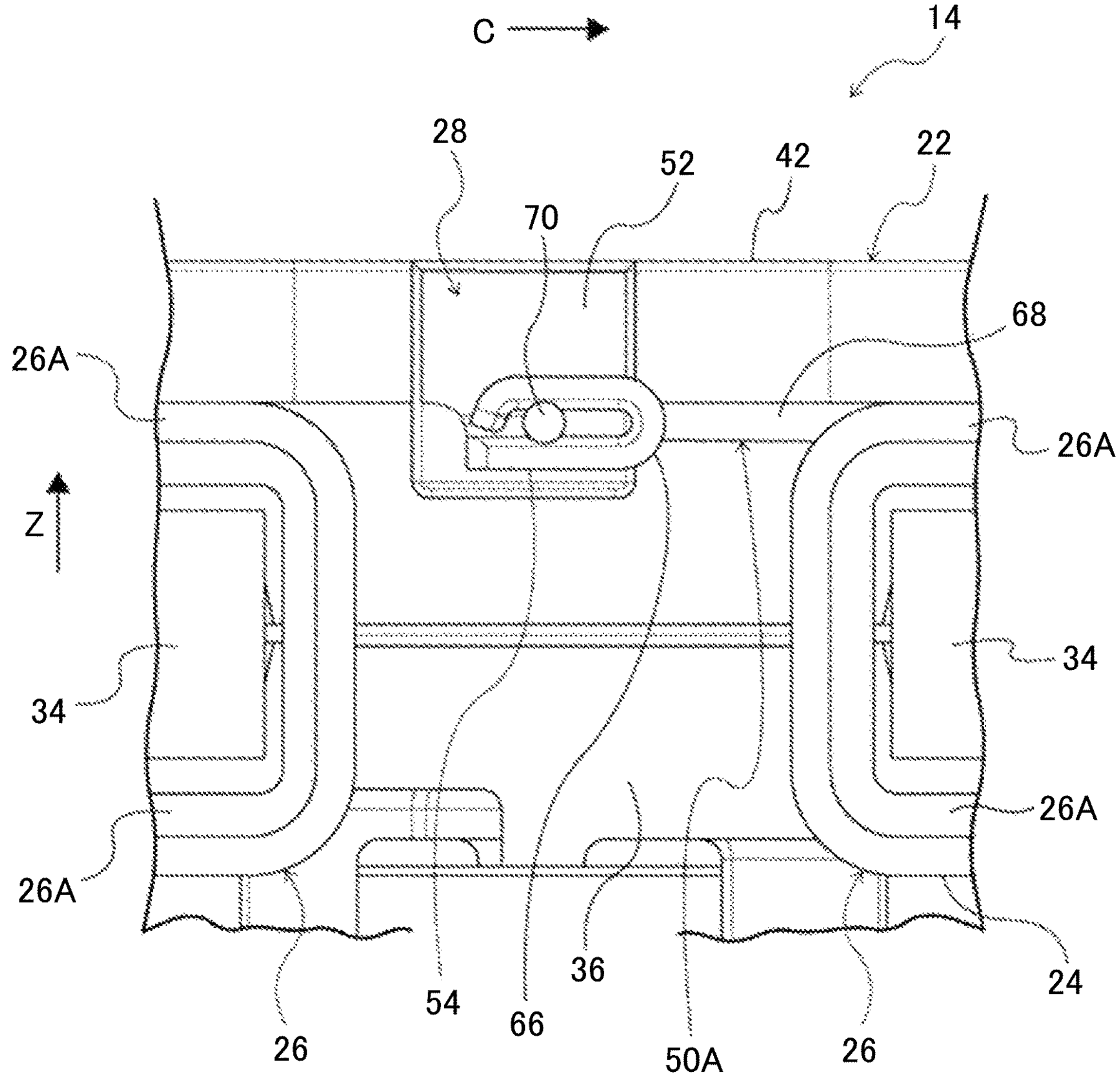
FIG. 5 is an enlarged side view, from a radially inner side, of the part of the stator where the first terminal is provided.

As shown in FIGS. 3, 4 and 5, the U-phase first terminal part 50A, the V-phase first terminal part 50A and the W-phase first terminal part 50A are connected respectively to the three first terminals 28. On the other hand, all of the U-phase second terminal part 50B, the V-phase second terminal part 50B and the W-phase second terminal part 50B are connected to the second terminal 30.

Figure 6:
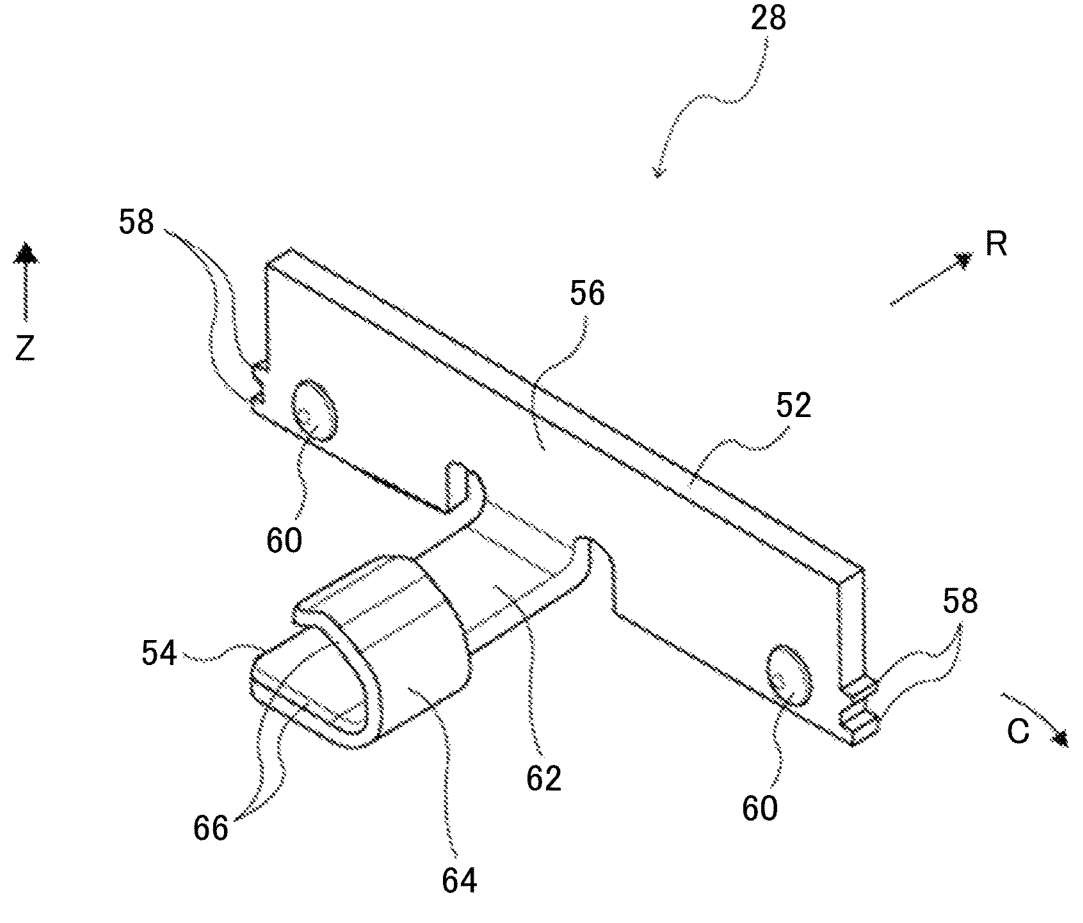
FIG. 6 is a perspective view of the first terminal.
Figure 7:
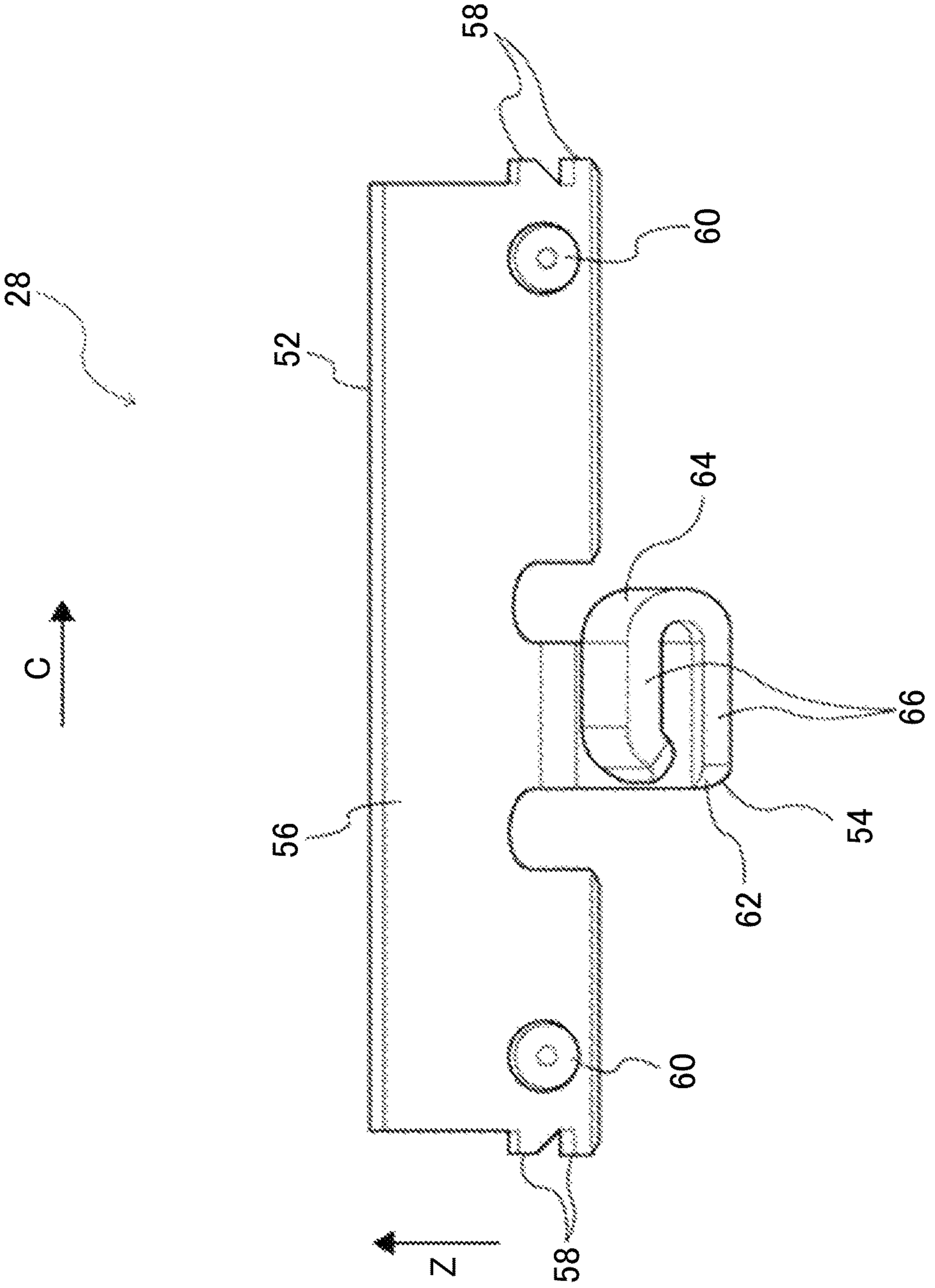
FIG. 7 is a perspective view, in a different direction from FIG. 6, of the first terminal.

As shown in FIGS. 6 and 7, each of the first terminals 28 is formed by performing press working or the like on a copper plate which is an electroconductive member. Each of the first terminals 28 has a first insulator-fixed part 52 formed in the shape of a rectangular plate whose thickness direction coincides with the radial direction. Moreover, each of the first terminals 28 also has a crimp piece 54 extending radially inward from the second-axial-side end of a circumferentially central portion of the first insulator-fixed part 52.

The first insulator-fixed part 52 includes a base plate part 56 formed in the shape of a rectangle that has, when viewed in the radial direction, its longitudinal direction coinciding with the circumferential direction and its lateral direction coinciding with the axial direction. The first insulator-fixed part 52 has a plurality (e.g., two in the present embodiment) of press-fit portions 58 protruding toward the first circumferential side from a second-axial-side portion of the base plate part 56 at the first-circumferential-side end thereof. Moreover, the first insulator-fixed part 52 also has a plurality (e.g., two in the present embodiment) of press-fit portions 58 protruding toward the second circumferential side from a second-axial-side portion of the base plate part 56 at the second-circumferential-side end thereof. The press-fit portions 58 have a sawtooth shape when viewed in the radial direction. Furthermore, the first insulator-fixed part 52 also has backlash-reducing protrusions 60 protruding radially inward respectively from the second-axial-side portions of the base plate part 56 at two circumferential end portions thereof.

The crimp piece 54 includes a base plate part 62 formed in the shape of a rectangle that has, when viewed in the axial direction, its longitudinal direction coinciding with the radial direction and its lateral direction coinciding with the circumferential direction. Moreover, the crimp piece 54 also includes an extension part 64 that extends toward the first circumferential side from the first-circumferential-side end of a radially inner end portion of the base plate part 62 and has its end portion on the opposite side to the base plate part 62 folded back to the second circumferential side. The extension part 64 constitutes, together with a distal end portion of the base plate part 62, a crimp part 66; the crimp part 66 serves as a locking part that is open on the second circumferential side. As shown in FIGS. 4 and 5, a corresponding one of the first terminal parts 50A described above is clamped in the crimp part 66, thereby being connected with the crimp part 66.

As shown in FIG. 4, the first insulator-fixed parts 52 of the first terminals 28 are inserted respectively in the first-terminal fitting portions 44 of the insulator 22. Consequently, the first insulator-fixed parts 52 are fixed to the insulator 22; thus, the first terminals 28 are supported by the insulator 22. Moreover, in the state of the first insulator-fixed parts 52 being inserted respectively in the first-terminal fitting portions 44 of the insulator 22, the press-fit portions 58 of the first insulator-fixed parts 52 are fitted to inner walls of the respective first-terminal fitting portions 44 in a press-fitted state. Consequently, the state of the first insulator-fixed parts 52 being fixed to the insulator 22 can be maintained. As shown in FIGS. 4, 6 and 7, for each of the first insulator-fixed parts 52, the press-fit portions 58 of the first insulator-fixed part 52 on the first circumferential side are located at the same circumferential position as that one of a circumferentially-adjacent pair of the teeth 34 which is located on the first circumferential side; and the press-fit portions 58 of the first insulator-fixed part 52 on the second circumferential side are located at the same circumferential position as the other of the circumferentially-adjacent pair of the teeth 34 which is located on the second circumferential side. Furthermore, as shown in FIGS. 4 and 5, the crimp piece 54 of the first terminal 28 is located in a circumferentially intermediate area between the circumferentially-adjacent pair of the teeth 34. In addition, the base plate part 62 of the crimp piece 54 is located between those coil ends 26A of a circumferentially-adjacent pair of the coils 26 which are located on the first axial side.

As shown in FIG. 4, each of the first terminal parts 50A has a first portion 68 routed from a radially outer end portion of the corresponding coil end 26A on the first axial side toward the second circumferential side. Moreover, each of the first terminal parts 50A also has a second portion 70 routed from the second-circumferential-side end of the first portion 68 radially inward (i.e., toward the opposite side to the annular part 32 of the stator core 20); the second portion 70 serves as a connection portion. Furthermore, each of the first terminal parts 50A also has a slack portion 72 formed at the boundary between the first portion 68 and the second portion 70; the slack portion 72 is bent in an L-shape from the first portion 68 to the second portion 70. In addition, the second portions 70 of the first terminal parts 50A are connected respectively to the crimp parts 66 of the first terminals 28.

As shown in FIGS. 4 and 5, in the state of the second portions 70 of the first terminal parts 50A being connected respectively with the crimp parts 66 of the first terminals 28, each of the second portions 70 of the first terminal parts 50A is arranged along the first-axial-side surface of a corresponding one of the base plate parts 62 of the crimp pieces 54 of the first terminals 28. Moreover, for each of the first terminal parts 50A, all of the first portion 68, the second portion 70 and the slack portion 72 of the first terminal part 50A are located between those coil ends 26A of a circumferentially-adjacent pair of the coils 26 which are located on the first axial side.

Figure 8:
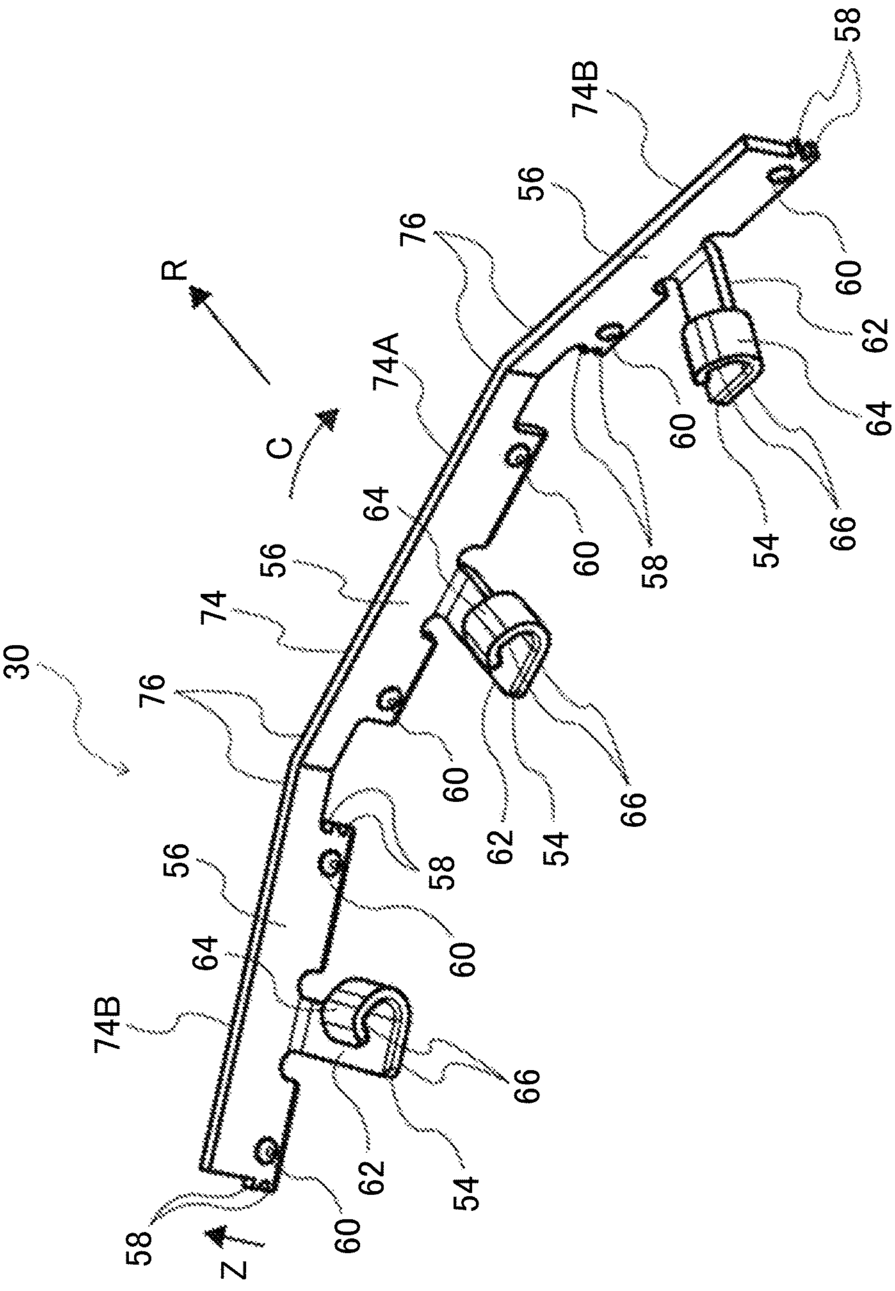
FIG. 8 is a perspective view of a second terminal.
Figure 9:
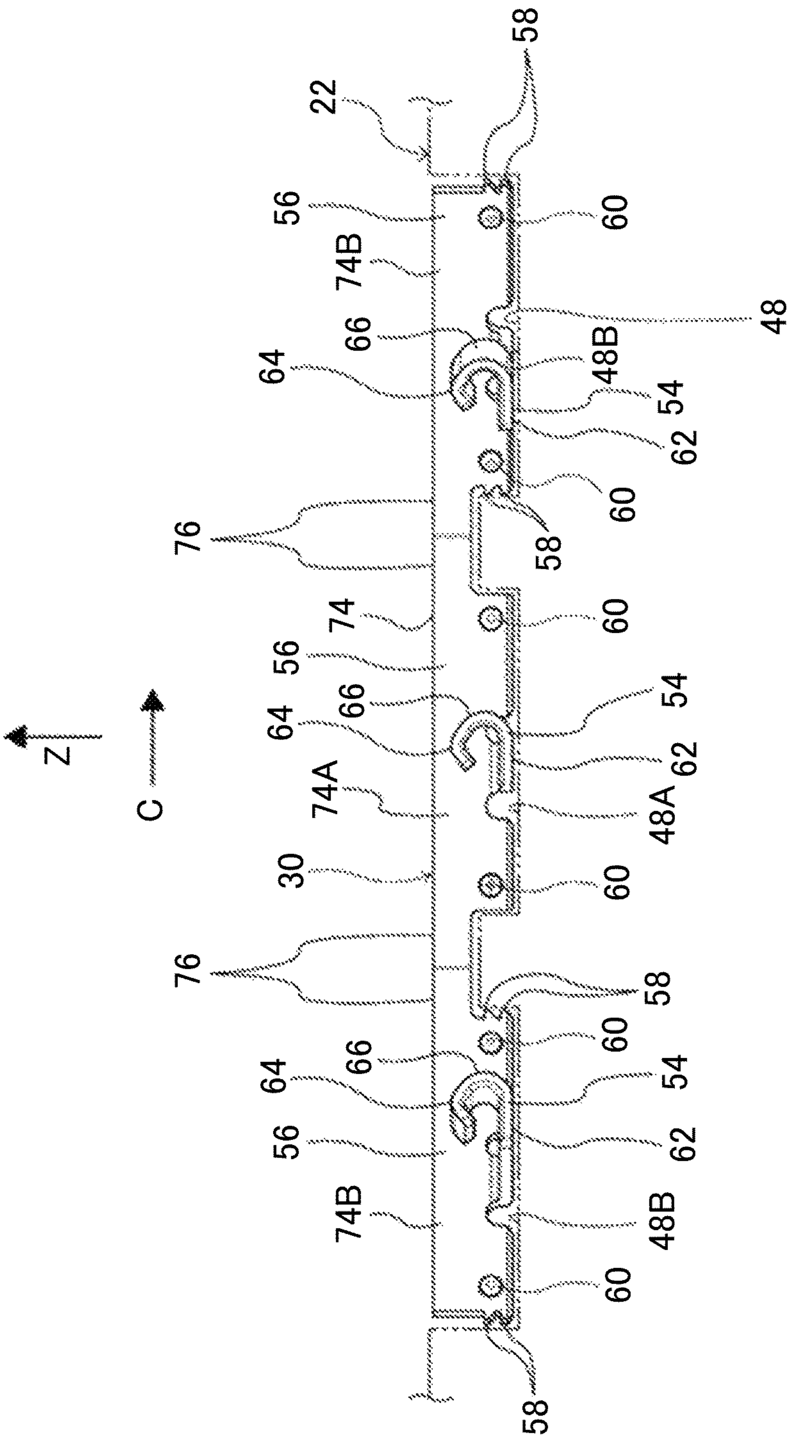
FIG. 9 is a side view, from a radially inner side, of the second terminal.

As shown in FIGS. 8 and 9, similar to the first terminals 28, the second terminal 30 is formed by performing press working or the like on a copper plate which is an electroconductive member. The second terminal 30 has a second insulator-fixed part 74 formed in the shape of a plate that extends in the circumferential direction with its thickness direction coinciding with the radial direction.

Hereinafter, a circumferentially central part of the second insulator-fixed part 74 will be referred to as the central fixed part 74A; and first-circumferential-side and second-circumferential-side end parts of the second insulator-fixed part 74 will be referred to as the end fixed parts 74B.

The central fixed part 74A is configured identically to the first insulator-fixed parts 52 of the first terminals 28 (see FIG. 6), except that the central fixed part 74A has no press-fit portions 58 and instead has connection pieces 76 extending from both circumferential side portions of the central fixed part 74A at the first-axial-side end thereof.

The end fixed part 74B on the first circumferential side is configured identically to the first insulator-fixed parts 52 of the first terminals 28 (see FIG. 6), except that the end fixed part 74B has a connection piece 76 extending from an end portion thereof on the first axial side and the second circumferential side. Moreover, the connection piece 76 of the end fixed part 74B on the first circumferential side is connected with that one of the connection pieces 76 of the central fixed part 74A which is on the first circumferential side.

The end fixed part 74B on the second circumferential side is configured identically to the first insulator-fixed parts 52 of the first terminals 28 (see FIG. 6), except that the end fixed part 74B has a connection piece 76 extending from an end portion thereof on the first axial side and the first circumferential side. Moreover, the connection piece 76 of the end fixed part 74B on the second circumferential side is connected with that one of the connection pieces 76 of the central fixed part 74A which is on the second circumferential side.

It should be noted that portions of the central and end fixed parts 74A and 74B corresponding to those of the first insulator-fixed parts 52 of the first terminals 28 are designated by the same reference numerals as those of the first insulator-fixed parts 52.

Moreover, the second terminal 30 has three crimp pieces 54 extending radially inward respectively from the second-axial-side end of the central fixed part 74A, the second-axial-side end of the end fixed part 74B on the first circumferential side and the second-axial-side end of the end fixed part 74B on the second circumferential side. The three crimp pieces 54 of the second terminal 30 are arranged at equal intervals in the circumferential direction. Moreover, the three crimp pieces 54 of the second terminal 30 each have the same configuration as the crimp pieces 54 of the three first terminals 28. It should be noted that portions of the crimp pieces 54 of the second terminal 30 corresponding to those of the crimp pieces 54 of the first terminals 28 are designated by the same reference numerals as those of the crimp pieces 54 of the first terminals 28. As shown in FIG. 3, the second terminal parts 50B described above are clamped respectively in the crimp parts 66 of the crimp pieces 54 of the second terminal 30, thereby being connected respectively with the crimp parts 66.

As shown in FIGS. 3 and 9, the second insulator-fixed part 74 of the second terminal 30 described above is inserted in the second-terminal fitting portion 48 of the insulator 22. Specifically, as shown in FIG. 9, in a circumferentially central portion of the second-terminal fitting portion 48 at the bottom thereof, there is formed a central fitting recess 48A in which a second-axial-side end portion of the central fixed part 74A is inserted. Moreover, in a first-circumferential-side end portion of the second-terminal fitting portion 48 at the bottom thereof, there is formed an end fitting recess 48B in which a second-axial-side end portion of the end fixed part 74B on the first circumferential side is inserted. Furthermore, in a second-circumferential-side end portion of the second-terminal fitting portion 48 at the bottom thereof, there is formed an end fitting recess 48B in which a second-axial-side end portion of the end fixed part 74B on the second circumferential side is inserted. Moreover, in the state of the second insulator-fixed part 74 of the second terminal 30 being inserted in the second-terminal fitting portion 48 of the insulator 22, the second-axial-side end portion of the central fixed part 74A is located in the central fitting recess 48A; and the second-axial-side end portions of the end fixed parts 74B on the first and second circumferential sides are located respectively in the end fitting recesses 48B on the first and second circumferential sides. Consequently, the second insulator-fixed part 74 is fixed to the insulator 22; thus, the second terminal 30 is supported by the insulator 22. Furthermore, in the state of the second-axial-side end portions of the end fixed parts 74B being inserted respectively in the end fitting recesses 48B, the press-fit portions 58 of the end fixed parts 74B are fitted to inner walls of the respective end fitting recesses 48B in a press-fitted state. Consequently, the state of the second insulator-fixed part 74 being fixed to the insulator 22 can be maintained. Moreover, similar to the press-fit portions 58 of the first terminals 28, the press-fit portions 58 of the end fixed parts 74B of the second terminal 30 are located at the same circumferential positions as predetermined teeth 34. Furthermore, as shown in FIG. 3, each of the three crimp pieces 54 of the second terminal 30 is located in a circumferentially intermediate area between a circumferentially-adjacent pair of the teeth 34.

As shown in FIG. 3, the second terminal parts 50B have the same configuration as the first terminal parts 50A. It should be noted that portions of the second terminal parts 50B corresponding to those of the first terminal parts 50A are designated by the same reference numerals as those of the first terminal parts 50A. The second portions 70 of the second terminal parts 50B of the respective phases are connected respectively to the three crimp parts 66 of the second terminal 30.

Next, a configuration for suppressing wear of those portions of the windings 24 which are led out from the coils 26 will be described.

Figure 10:
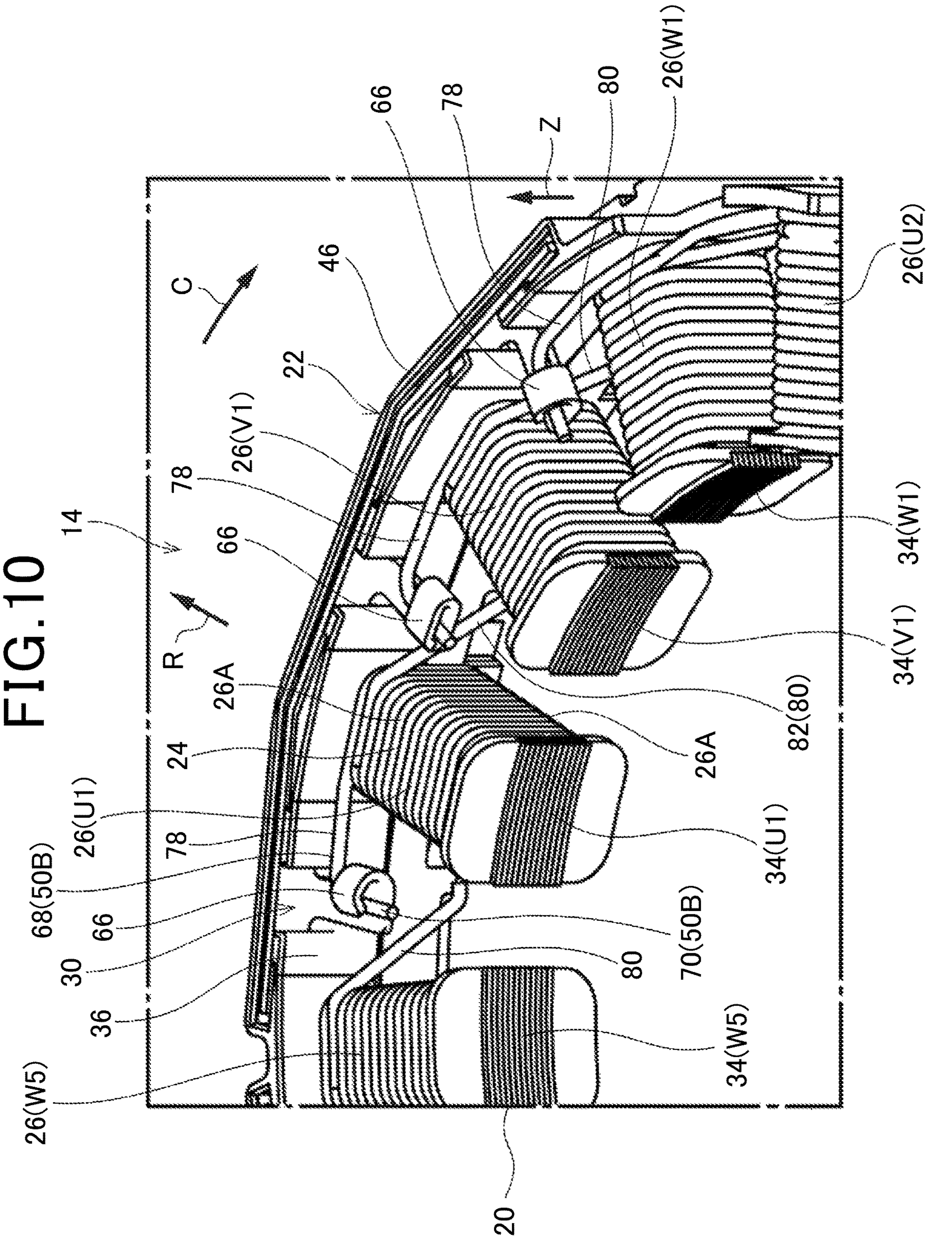
FIG. 10 is an enlarged perspective view of part of the stator.

FIG. 10 shows part of the stator 14 where the second terminal 30 is provided. Here, for each phase, the coils 26 of the phase are numbered in order from that one of the coils 26 of the phase which is located closest to the second terminal 30 on the first circumferential side.

Specifically, that one of the U-phase coils 26 which is located closest to the second terminal 30 is numbered as U1. Moreover, that one of the U-phase coils 26 which is located adjacent to and on the first circumferential side of U1 is numbered as U2; that one of the U-phase coils 26 which is located adjacent to and on the first circumferential side of U2 is numbered as U3; that one of the U-phase coils 26 which is located adjacent to and on the first circumferential side of U3 is numbered as U4; and that one of the U-phase coils 26 which is located adjacent to and on the first circumferential side of U4 is numbered as U5. Similarly, the five V-phase coils 26 are numbered respectively as V1 to V5; and the five W-phase coils 26 are numbered respectively as W1 to W5.

Furthermore, the teeth 34 of the stator core 20 are also numbered. Specifically, that one of the teeth 34 around which the coil 26 numbered as U1 is formed is also numbered as U1; that one of the teeth 34 around which the coil 26 numbered as V1 is formed is also numbered as V1; and that one of the teeth 34 around which the coil 26 numbered as W1 is formed is also numbered as W1. Similarly, the remaining teeth 34 are numbered respectively as U2 to U5, V2 to V5 and W2 to W5.

In the following explanation, when referring to a specific coil 26, the number of the coil 26 will be added in parentheses to the end of the reference numeral 26 designating the coil 26 depending on the situation. Moreover, in the following explanation, when referring to a specific tooth 34, the number of the tooth 34 will be added in parentheses to the end of the reference numeral 34 designating the tooth 34 depending on the situation.

Figure 11:
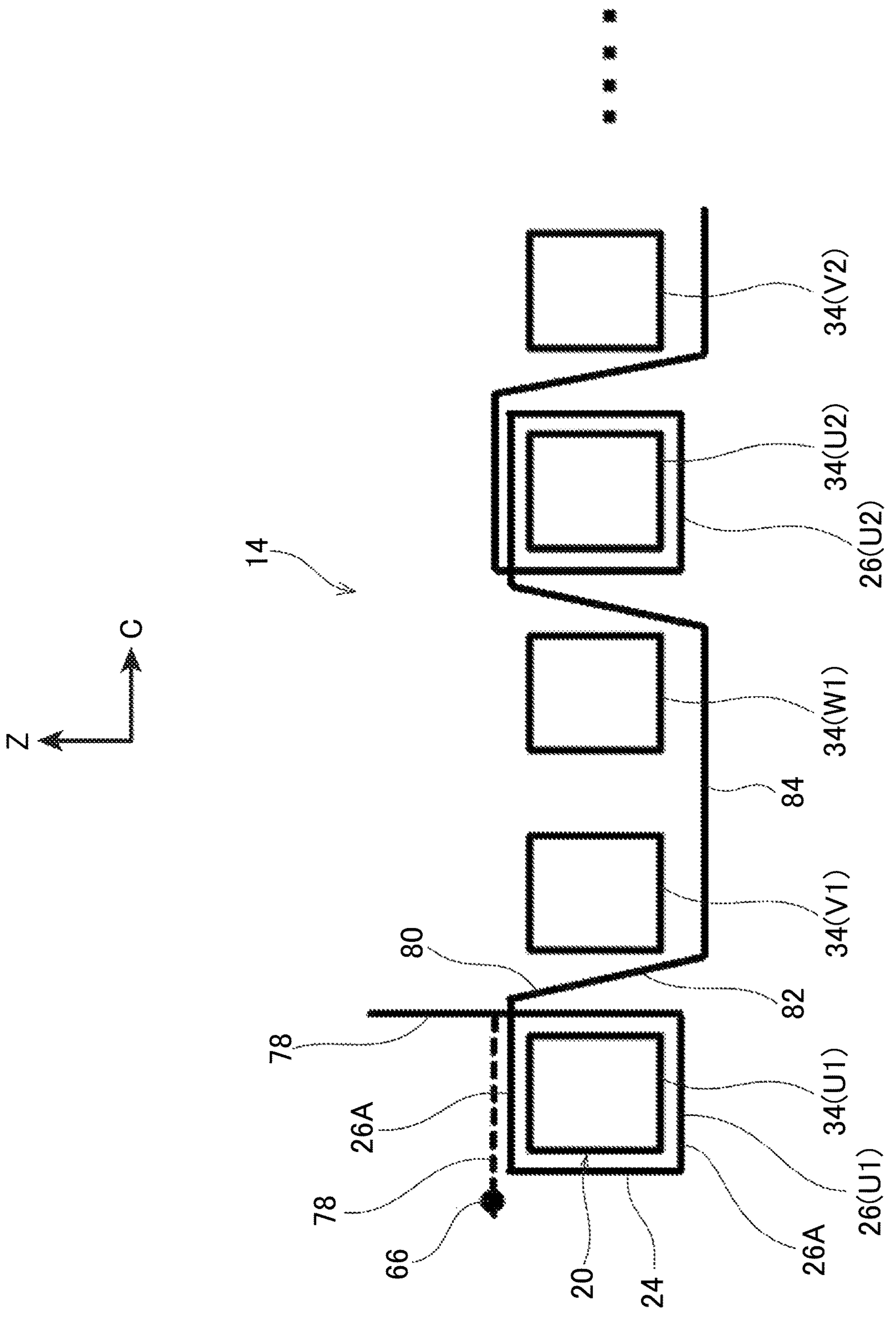
FIG. 11 is a schematic diagram of that part of the stator which is shown in FIG. 10.

As shown in FIGS. 10 and 11, portions of the winding 24 that forms the coil 26 (U1) are led out from the coil 26 (U1) to form a first lead wire 78 and a second lead wire 80. Specifically, both the first lead wire 78 and the second lead wire 80 are led out from the space between the circumferentially-adjacent pair of the teeth 34 (U1) and 34 (V1). It should be noted that: the first lead wire 78 shown by a solid line in FIG. 11 represents the first lead wire 78 in a state of being led out toward the first axial side; and the first lead wire 78 shown by a dashed line in FIG. 11 represents the first lead wire 78 in a state of being routed along a predetermined path.

The first lead wire 78 led out from the coil 26 (U1) constitutes the U-phase second terminal part 50B described above. The second portion 70 of the U-phase second terminal part 50B is connected to that one of the crimp parts 66 of the second terminal 30 which is located between the pair of the teeth 34 (W5) and 34 (U1) (i.e., between the pair of the coils 26 (W5) and 26 (U1)).

The second lead wire 80 led out from the coil 26 (U1) constitutes a connection part that connects the coil 26 (U1) and the coil 26 (U2). The second lead wire 80 has an inclined portion 82 that is routed in such a manner as to be inclined toward the second axial side as it extends from the radially outer portion of the coil end 26A on the first axial side toward the first circumferential side. Moreover, the inclined portion 82 is routed along the radially inner surface of the annular covering part 36 of the insulator 22 between the coils 26 (U1) and 26 (V1) (i.e., between the teeth 34 (U1) and 34 (V1)).

As shown in FIG. 11, the second lead wire 80 also has an outer routed portion 84 that is routed from the end of the inclined portion 82 on the opposite side to the coil 26 (U1) toward the first circumferential side. Moreover, as shown in FIGS. 10 and 11, the outer routed portion 84 is routed along a second-axial-side end part of the insulator 22 on the radially outer side of the annular covering part 36. It should be noted that: the routing path of the second lead wire 80 is not limited to the above; and other routing paths may alternatively be employed, such as a path routing a portion corresponding to the outer routed portion 84 along a first-axial-side end part of the insulator 22.

As shown in FIG. 10, similar to the portions of the winding 24 that forms the coil 26 (U1), portions of the winding 24 that forms the coil 26 (V1) are led out from the coil 26 (V1) to form a first lead wire 78 and a second lead wire 80. Specifically, both the first lead wire 78 and the second lead wire 80 are led out from the space between the circumferentially-adjacent pair of the teeth 34 (V1) and 34 (W1).

The first lead wire 78 led out from the coil 26 (V1) constitutes the V-phase second terminal part 50B described above. The second portion 70 of the V-phase second terminal part 50B is connected to that one of the crimp parts 66 of the second terminal 30 which is located between the pair of the teeth 34 (U1) and 34 (V1) (i.e., between the pair of the coils 26 (U1) and 26 (V1)).

The second lead wire 80 led out from the coil 26 (V1) constitutes a connection part that connects the coil 26 (V1) and the coil 26 (V2). The second lead wire 80 has an inclined portion 82 and the like, similar to the second lead wire 80 led out from the coil 26 (U1). The inclined portion 82 of the second lead wire 80 led out from the coil 26 (V1) is routed along the radially inner surface of the annular covering part 36 of the insulator 22 between the coils 26 (V1) and 26 (W1) (i.e., between the teeth 34 (V1) and 34 (W1)).

Similar to the portions of the winding 24 that forms the coil 26 (U1), portions of the winding 24 that forms the coil 26 (W1) are led out from the coil 26 (W1) to form a first lead wire 78 and a second lead wire 80. Specifically, both the first lead wire 78 and the second lead wire 80 are led out from the space between the circumferentially-adjacent pair of the teeth 34 (W1) and 34 (U2).

The first lead wire 78 led out from the coil 26 (W1) constitutes the W-phase second terminal part 50B described above. The second portion 70 of the W-phase second terminal part 50B is connected to that one of the crimp parts 66 of the second terminal 30 which is located between the pair of the teeth 34 (V1) and 34 (W1) (i.e., between the pair of the coils 26 (V1) and 26 (W1))

The second lead wire 80 led out from the coil 26 (W1) constitutes a connection part that connects the coil 26 (W1) and the coil 26 (W2). The second lead wire 80 has an inclined portion 82 and the like, similar to the second lead wire 80 led out from the coil 26 (U1). The inclined portion 82 of the second lead wire 80 led out from the coil 26 (W1) is routed along the radially inner surface of the annular covering part 36 of the insulator 22 between the coils 26 (W1) and 26 (U2) (i.e., between the teeth 34 (W1) and 34 (U2)).

Although detailed explanation is omitted, a first lead wire 78 and a second lead wire 80 are also led out from each of the coil 26 (U5), the coil 26 (V5) and the coil 26 (W5). The first and second lead wires 78 and 80 led out from the coils 26 (U5, V5, W5) correspond to the first and second lead wires 78 and 80 led out from the coils 26 (U1, V1, W1) described above. Moreover, the first terminal parts 50A, which are constituted of the respective first lead wires 78 led out from the coils 26 (U5, V5, W5), are connected respectively to the crimp parts 66 of the first terminals 28. On the other hand, the inclined portions 82 of the second lead wires 80 led out from the coils 26 (U5, V5, W5) are routed respectively between the coils 26 (U5) and 26 (V5), between the coils 26 (V5) and 26 (W5) and between the coils 26 (W5) and 26 (U1).

As shown in FIG. 10, the U-phase second terminal part 50B, which is constituted of the first lead wire 78 led out from the coil 26 (U1), and the inclined portion 82 of the second lead wire 80 led out from the coil 26 (W5) are spaced apart from each other in the axial direction between the two coils 26 (U1, W5). Moreover, the V-phase second terminal part 50B, which is constituted of the first lead wire 78 led out from the coil 26 (V1), and the inclined portion 82 of the second lead wire 80 led out from the coil 26 (U1) are spaced apart from each other in the axial direction between the two coils 26 (V1, U1). Furthermore, the W-phase second terminal part 50B, which is constituted of the first lead wire 78 led out from the coil 26 (W1), and the inclined portion 82 of the second lead wire 80 led out from the coil 26 (V1), are spaced apart from each other in the axial direction between the two coils 26 (W1, V1). In addition, although detailed explanation is omitted, similar to the first lead wires 78 led out from the coils 26 (U1, V1, W1), the first lead wires 78 led out from the coils 26 (U5, V5, W5) are also spaced apart in the axial direction respectively from the inclined portions 82 of the second lead wires 80 located at predetermined positions.

Next, operation and effects of the motor 10 according to the present embodiment will be described.

As shown in FIGS. 1 to 3, in the motor 10 according to the present embodiment, voltages applied to the three first terminals 28 are switched, thereby switching electric currents flowing through the coils 26 of the respective phases. Consequently, a rotating magnetic field is generated around the stator 14, causing the rotor 12 to rotate.

In the present embodiment, as shown in FIGS. 2 to 5, the crimp parts 66 of the first terminals 28 and the crimp parts 66 of the second terminal 30 are each configured to be arranged between a circumferentially-adjacent pair of the teeth 34 (or the coils 26). Consequently, with the above configuration, it becomes possible to achieve reduction in the size of the stator 14 in the axial direction in comparison with the configuration where the crimp parts 66 of the first terminals 28 and the crimp parts 66 of the second terminal 30 are each arranged on the first axial side or the second axial side of the stator core 20.

Moreover, in the present embodiment, as shown in FIGS. 3, 4, 6, 7, 8 and 9, in state of the first insulator-fixed parts 52 of the first terminals 28 being inserted respectively in the first-terminal fitting portions 44 of the insulator 22, the press-fit portions 58 of the first insulator-fixed parts 52 are fitted to the inner walls of the respective first-terminal fitting portions 44 in the press-fitted state. Consequently, it becomes possible to prevent the first terminals 28 from being displaced relative to the insulator 22 due to vibration of the motor 10. As a result, it becomes possible to ensure or improve the reliability of the motor 10 against vibration. In particular, with the press-fit portions 58 provided on both the circumferential sides of each of the crimp pieces 54 of the first terminals 28, it becomes possible to suppress vibration of the crimp pieces 54.

Furthermore, in the present embodiment, in the state of the second insulator-fixed part 74 of the second terminal 30 being inserted in the second-terminal fitting portion 48 of the insulator 22, the press-fit portions 58 are fitted to the inner walls of the respective end fitting recesses 48B in the press-fitted state. Consequently, it becomes possible to prevent the second terminal 30 from being displaced relative to the insulator 22 due to vibration of the motor 10. As a result, it becomes possible to ensure or improve the reliability of the motor 10 against vibration. In particular, in the second terminal 30 according to the present embodiment, the press-fit portions 58 are provided in the end fixed parts 74B; no press-fit portions 58 are provided in the central fixed part 74A. Consequently, it becomes possible to effectively suppress vibration of the two circumferential end parts of the second terminal 30 against the circumferentially central part of the second terminal 30.

Furthermore, in the present embodiment, as shown in FIGS. 3, 4 and 5, each of the first and second terminal parts 50A and 50B of the coils 26 is configured to have the first portion 68, the second portion 70 and the slack portion 72. Consequently, it becomes possible to alleviate, by the slack portion 72, tension generated in each of the first and second terminal parts 50A and 50B. Thus, it also becomes possible to alleviate stress generated in the connection portions between the coils 26 and the terminals (i.e., the first terminals 28 and the second terminal 30). As a result, it becomes possible to prevent disconnection from occurring at the first and second terminal parts 50A and 50B of the coils 26.

Furthermore, in the present embodiment, as shown in FIGS. 3 to 5, the second portions 70 of the first and second terminal parts 50A and 50B are arranged respectively along the first-axial-side surfaces of the base plate parts 62 of the crimp pieces 54. Consequently, it becomes possible to suppress, by the base plate parts 62 of the crimp pieces 54, displacement of the second portions 70 toward the second axial side when the motor 10 vibrates in the axial direction. As a result, it becomes possible to suppress torsional deformation of the first portions 68 of the first and second terminal parts 50A and 50B due to axial displacement of the second portions 70.

Furthermore, in the present embodiment, for each of the first and second terminal parts 50A and 50B, all of the first portion 68, the second portion 70 and the slack portion 72 of the terminal part are located between those coil ends 26A of a circumferentially-adjacent pair of the coils 26 which are on the first axial side. Consequently, it becomes possible to suppress increase in the lengths of the first and second terminal parts 50A and 50B in comparison with the case of the first portion 68, the second portion 70 and the slack portion 72 being located away from the above-described location.

Furthermore, in the present embodiment, as shown in FIGS. 10 and 11, both a first lead wire 78 and a second lead wire 80 are led out from the coil 26 (U1). Further, the first and second lead wires 78 and 80 led out from the coil 26 (U1) are routed respectively toward mutually opposite circumferential sides. Consequently, it becomes possible to prevent the first and second lead wires 78 and 80 led out from the coil 26 (U1) from making contact with each other. As a result, it becomes possible to prevent or suppress wear of the first and second lead wires 78 and 80 led out from the coil 26 (U1) due to contact therebetween. Similarly, for the first and second lead wires 78 and 80 led out from each of the coils 26 (V1, W1, U5, V5, W5), it also become possible to prevent or suppress wear thereof due to contact therebetween.

Furthermore, in the present embodiment, the second portion 70 of the first lead wire 78 (i.e., one of the first terminal parts 50A or one of the second terminal parts 50B) is connected to one of the crimp parts 66 which is located at a position out of the space between the circumferentially-adjacent pair of the teeth 34 from which both the first and second lead wires 78 and 80 are led out. With such a configuration, it becomes possible to prevent or suppress wear of the first and second lead wires 78 and 80, both of which are led out from the space between the circumferentially-adjacent pair of the teeth 34, due to contact therebetween.

Furthermore, in the present embodiment, the U-phase coils 26, the V-phase coils 26 and the W-phase coils 26 are arranged in this order in the circumferential direction. Moreover, the first lead wire 78 led out from a specific one of the coils 26 of a first one of the three phases and the second lead wire 80 led out from a specific one of the coils 26 of a second one of the three phases are spaced apart from each other in the axial direction between the specific coil 26 of the first phase and the specific coil 26 of the second phase. With such a configuration, it becomes possible to prevent or suppress wear of the first and second lead wires 78 and 80, which are led out respectively from the two specific coils 36 of different phases, due to contact therebetween.

Figure 12:
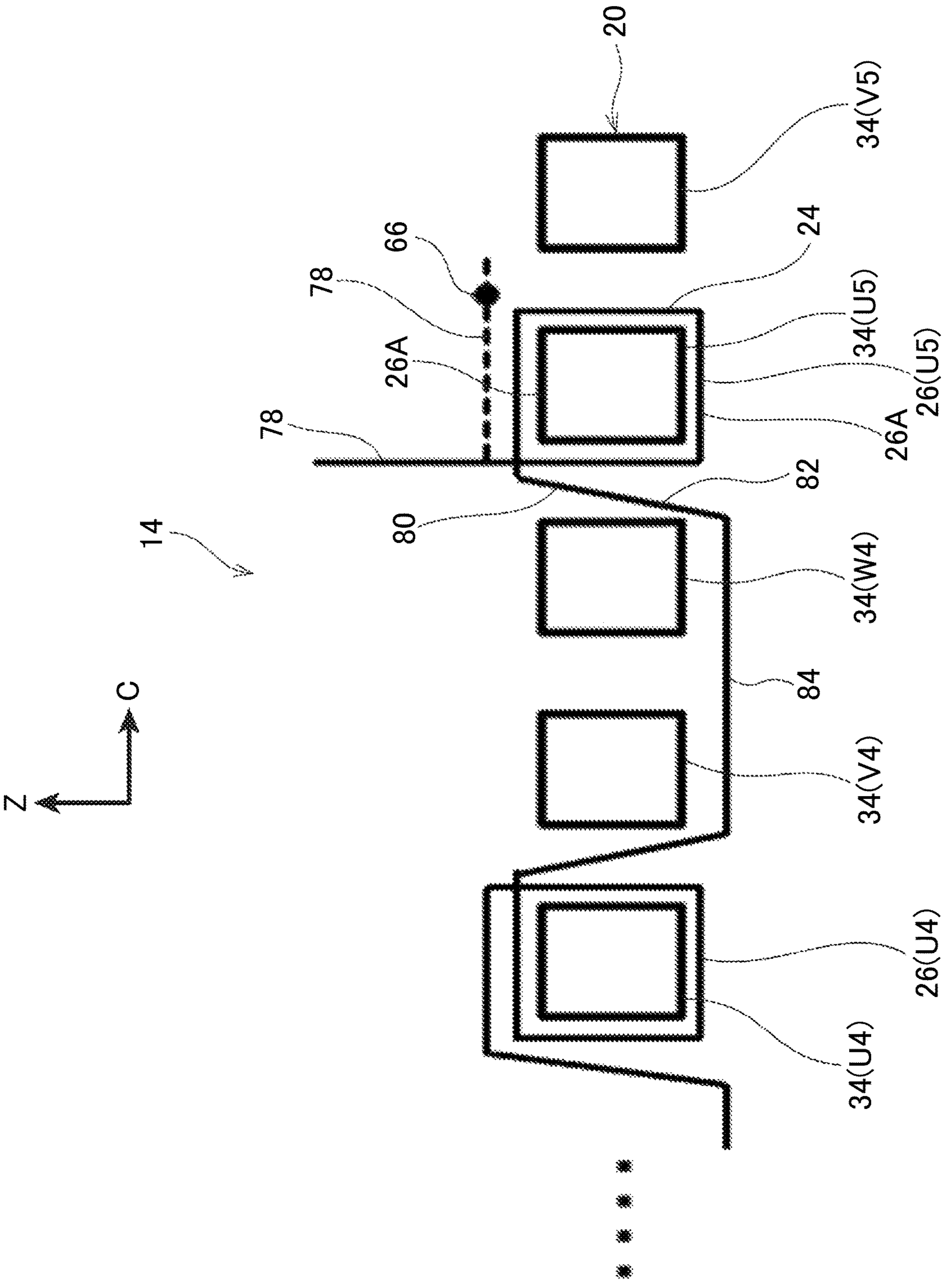
FIG. 12 is a schematic diagram of part of a stator of a motor according to a second embodiment.

In the first embodiment described above, an example has been given in which the first and second lead wires 78 and 80 led out from the coils 26 (U1, V1, W1) and the first and second lead wires 78 and 80 led out from the coils 26 (U5, V5, W5) are routed in the same manner; however, the present disclosure is not limited to this example. For example, as in a stator of a motor according to a second embodiment shown in FIG. 12, the routing directions of the first and second lead wires 78 and 80 led out from the coil 26 (U5) may be set to be opposite those in the first embodiment described above. In addition, although not shown in the drawings, in the stator of the motor according to the second embodiment, the routing directions of the first and second lead wires 78 and 80 led out from the coils 26 (V5, W5) are also set to be opposite those in the first embodiment described above.

Figure 13:
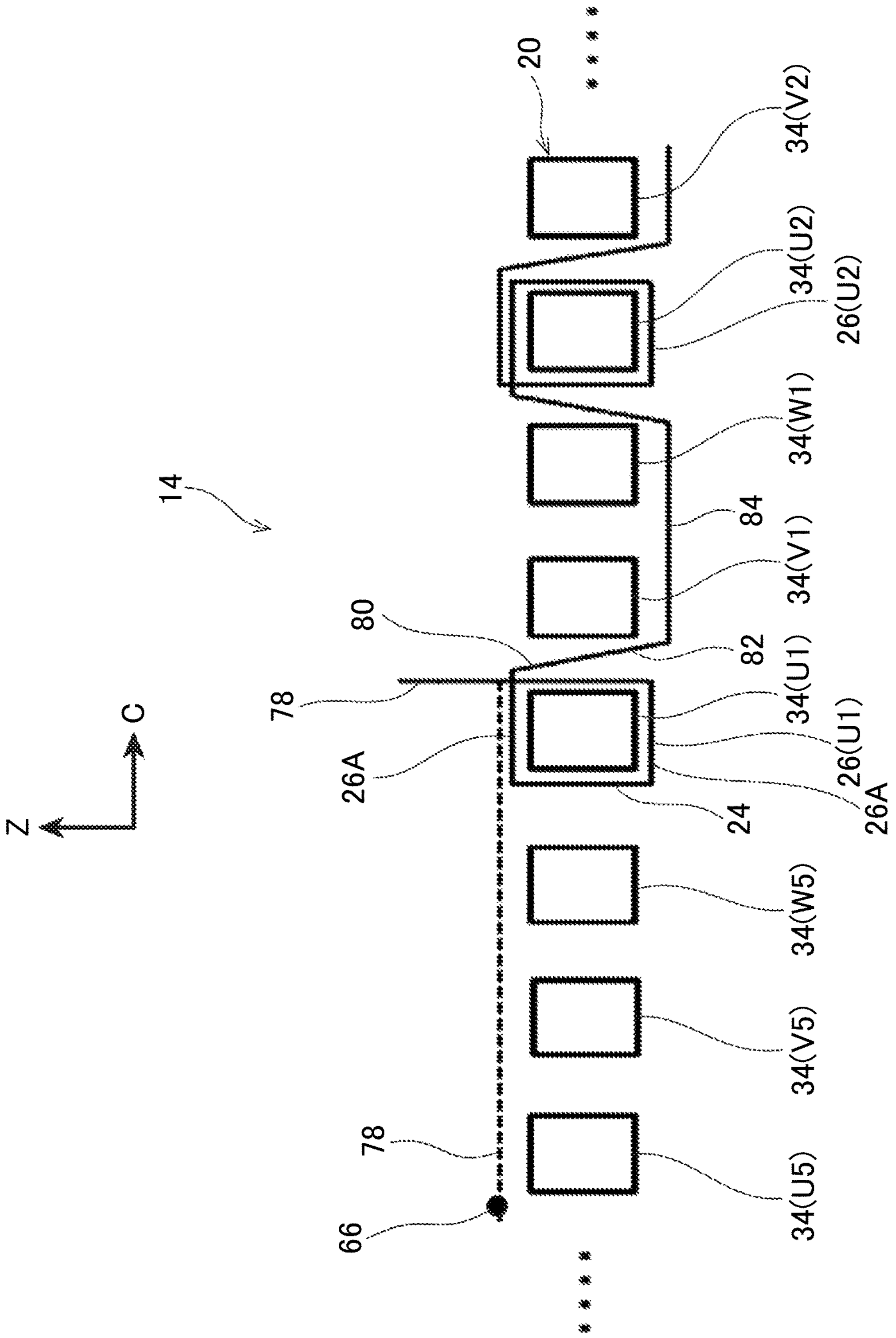
FIG. 13 is a schematic diagram of part of a stator of a motor according to a third embodiment.

In the first embodiment described above, an example has been given in which the first lead wires 78 led out from the coils 26 (U1, V1, W1, U5, V5, W5) are connected respectively to the crimp parts 66 located at positions adjacent to the coils 26 (U1, V1, W1, U5, V5, W5); however, the present disclosure is not limited to this example. For example, as in a stator of a motor according to a third embodiment shown in FIG. 13, the first lead wire 78 led out from the coil 26 (U1) may be connected to a crimp part 66 located at a position away from the coil 26 (U1). In addition, although not shown in the drawings, in the stator of the motor according to the third embodiment, the first lead wires 78 led out from the coils 26 (V1, W1, U5, V5, W5) are connected respectively to crimp parts 66 located at positions away from the coils 26 (V1, W1, U5, V5, W5).

In the first embodiment described above, an example has been given in which the first and second lead wires 78 and 80 led out from the same coil 26 are routed respectively toward mutually opposite circumferential sides; however, the present disclosure is not limited to this example. For example, a motor may be configured as in a fourth embodiment described below.

Figure 14:
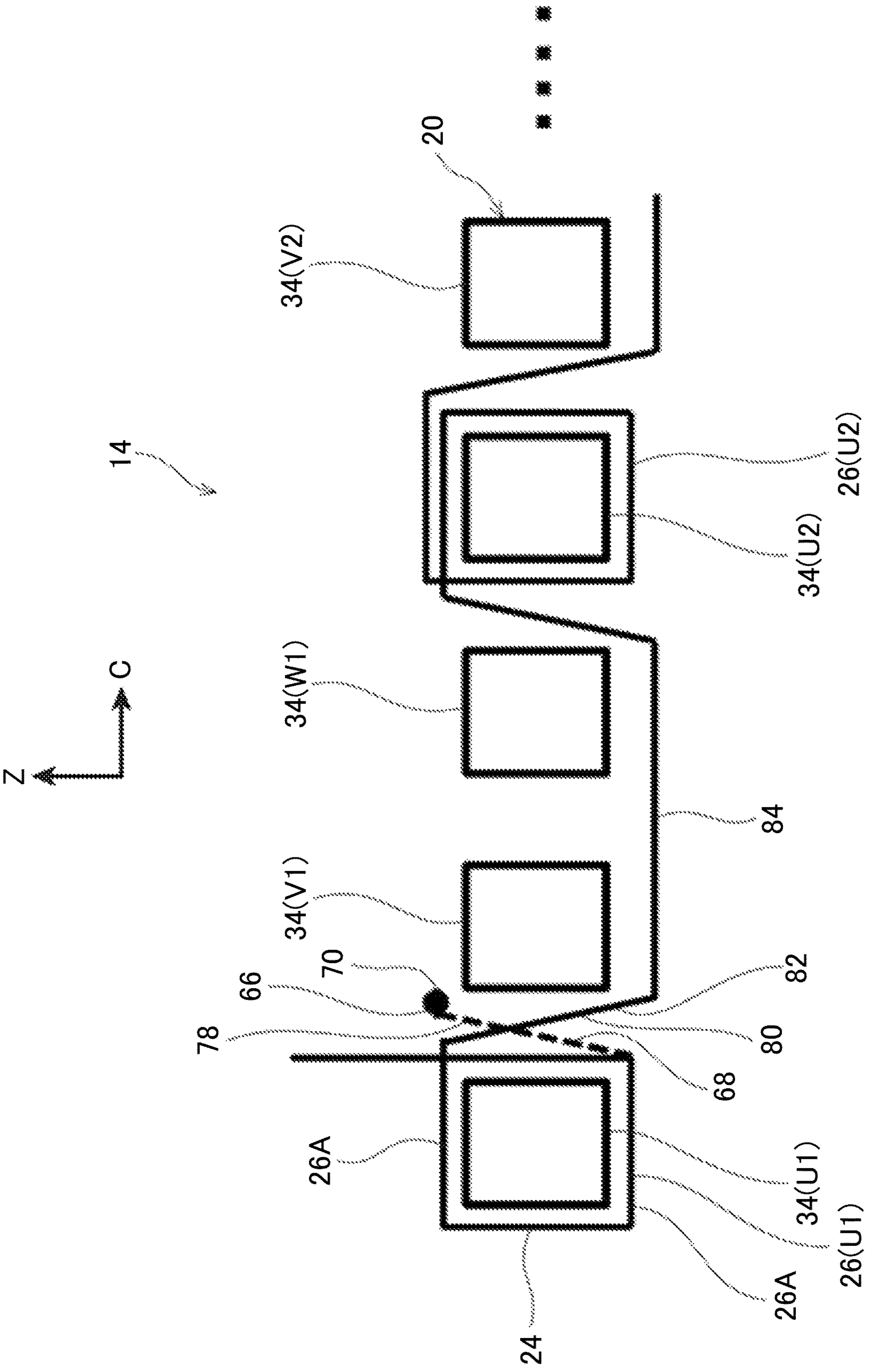
FIG. 14 is a schematic diagram of part of a stator of a motor according to a fourth embodiment.
Figure 15:
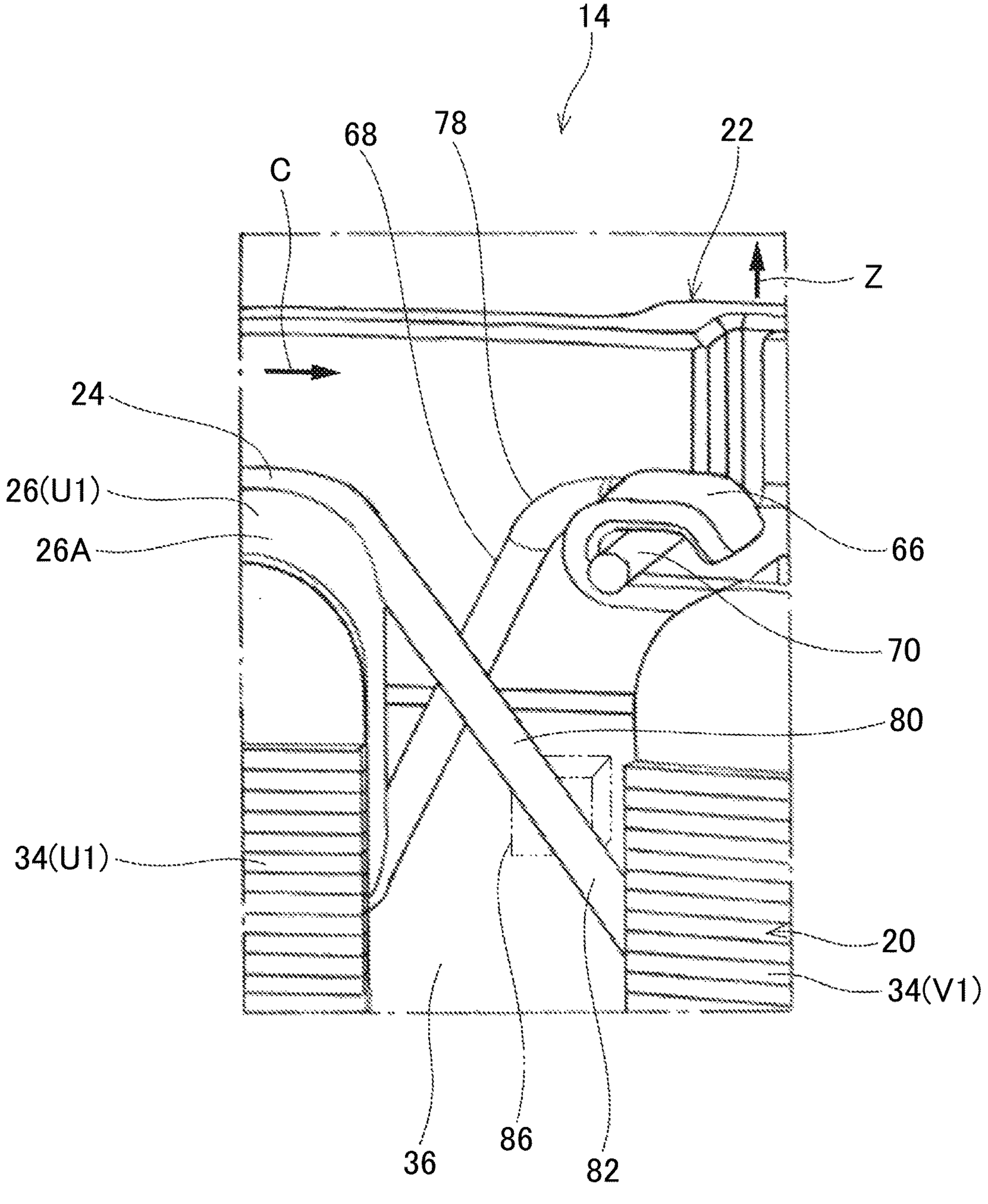
FIG. 15 is an enlarged perspective view of part of the stator of the motor according to the fourth embodiment.

As shown in FIGS. 14 and 15, in the motor according to the fourth embodiment, both the first and second lead wires 78 and 80 led out from the coil 26 (U1) are routed in the same circumferential direction, more particularly toward the first circumferential side.

The first lead wire 78 led out from the coil 26 (U1) has a first portion 68 routed in such a manner as to be inclined toward the first axial side as it extends from a radially outer portion of the coil end 26A on the second axial side toward the first circumferential side, and a second portion 70 routed radially inward from the first portion 68. The second portion 70 of the first lead wire 78 is connected to the crimp part 66 that is located between the pair of the teeth 34 (U1) and 34 (V1) (i.e., between the pair of the coils 26 (U1) and 26 (V1)).

The second lead wire 80 led out from the coil 26 (U1) has an inclined portion 82 that is routed in such a manner as to be inclined toward the second axial side as it extends from a radially outer portion of the coil end 26A on the first axial side toward the first circumferential side. Moreover, the inclined portion 82 is routed so that when viewed from the radially inner side, it intersects the first portion 68 of the first lead wire 78 led out from the coil 26 (U1). In addition, in the present embodiment, the inclined portion 82 is located radially inside the first portion 68 of the first lead wire 78 led out from the coil 26 (U1).

As shown in FIG. 15, the insulator 22 has a lead-wire contact portion 86 protruding from the annular covering part 36 radially inward and toward the inclined portion 82 of the second lead wire 80. The inclined portion 82 of the second lead wire 80 abuts against the lead-wire contact portion 86. Consequently, the state of the inclined portion 82 of the second lead wire 80 and the first portion 68 of the first lead wire 78 being spaced apart from each other can be maintained. As a result, it becomes possible to prevent or suppress wear of the first and second lead wires 78 and 80 led out from the coil 26 (U1) due to contact therebetween. In addition, although not shown in the drawings, the first and second lead wires 78 and 80 led out from the other coils 26 have the same configuration as the first and second lead wires 78 and 80 led out from the coil 26 (U1).

In the fourth embodiment described above, an example has been given in which the lead-wire contact portion 86 is provided in contact with the second lead wire 80; however, the present disclosure is not limited to this example. Depending on the positional relationship between the first and second lead wires 78 and 80, an alternative configuration may be employed where the lead-wire contact portion 86 is provided in contact with the first lead wire 78. Moreover, depending on the positional relationship between the first and second lead wires 78 and 80, another alternative configuration may be employed where a plurality of lead-wire contact portions 86 are provided respectively in contact with the first and second lead wires 78 and 80.

While the above particular embodiments of the present disclosure have been shown and described, it will be understood by those skilled in the art that the present disclosure is not limited to the above particular embodiments, but may be carried out through various modifications without departing from the spirit of the present disclosure.

Moreover, while the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

[Notes]

(First Note)

An armature (14) comprising:

an armature core (20) having an annular part (32) and a plurality of teeth (34) protruding from the annular part toward a radial side thereof and spaced apart from one another in a circumferential direction;

a plurality of coils (26) formed of electroconductive windings (24) wound around the respective teeth;

a terminal (28, 30) formed of an electroconductive member and having a locking part (66) arranged between a circumferentially-adjacent pair of the teeth;

a first lead wire (78) formed of a part of one of the windings which forms a specific coil among the plurality of coils, the first lead wire being routed from the specific coil to the locking part and having a connection portion (70) connected to the locking part; and a second lead wire (80) formed of another part of the one of the windings which forms the specific coil, the second lead wire being routed from the specific coil toward an opposite side to the first lead wire and connecting between the specific coil and another one of the plurality of coils.

(Second Note)

The armature according to the first note, wherein:

both the first lead wire and the second lead wire are led out from a space between a circumferentially-adjacent pair of the teeth; and the connection portion of the first lead wire is connected to the locking part that is located at a position out of the space between the circumferentially-adjacent pair of the teeth from which both the first lead wire and the second lead wire are led out.

(Third Note)

The armature according to the second note, comprising the plurality of coils of a plurality of phases, wherein:

among the plurality of coils, the specific coil of a first one of the plurality of phases is located on a first circumferential side of the locking part, and a specific coil of a second one of the plurality of phases is located on a second circumferential side of the locking part;

the connection portion of the first lead wire led out from the specific coil of the first phase is locked to the locking part that is located between the specific coil of the first phase and the specific coil of the second phase; and the first lead wire led out from the specific coil of the first phase and a second lead wire led out from the specific coil of the second phase are spaced apart from each other in an axial direction between the specific coil of the first phase and the specific coil of the second phase.

(Fourth Note)

An armature (14) comprising:

an armature core (20) having an annular part (32) and a plurality of teeth (34) protruding from the annular part toward a radial side thereof and spaced apart from one another in a circumferential direction;

a plurality of coils (26) formed of electroconductive windings (24) wound around the respective teeth;

a terminal (28, 30) formed of an electroconductive member and having a locking part (66) arranged between a circumferentially-adjacent pair of the teeth;

a first lead wire (78) formed of a part of one of the windings which forms a specific coil among the plurality of coils, the first lead wire being routed from the specific coil to the locking part and having a connection portion (70) connected to the locking part;

a second lead wire (80) formed of another part of the one of the windings which forms the specific coil, the second lead wire being routed from the specific coil to the first lead wire side and connecting between the specific coil and another one of the plurality of coils; and an insulator (22) formed of an electrically-insulative material and mounted to the armature core, the insulator having a lead-wire contact portion (86) against which at least one of the first and second lead wires abuts, thereby maintaining a state of the first and second lead wires being spaced apart from each other.

(Fifth Note)

A rotating electric machine (10) comprising a stator (14) and a rotor (12), wherein: one of the stator and the rotor includes the armature according to any one of the first to fourth notes; and the other of the stator and the rotor has a magnet (18) arranged to radially face the armature.

What is claimed is:

1. An armature comprising:

an armature core having an annular part and a plurality of teeth protruding from the annular part toward a radial side thereof and spaced apart from one another in a circumferential direction;

a plurality of coils formed of electroconductive windings wound around the respective teeth;

a terminal formed of an electroconductive member and having a locking part arranged between a circumferentially-adjacent pair of the teeth;

a first lead wire formed of a part of one of the windings which forms a specific coil among the plurality of coils, the first lead wire being routed from the specific coil to the locking part and having a connection portion connected to the locking part; and a second lead wire formed of another part of the one of the windings which forms the specific coil, the second lead wire being routed from the specific coil toward an opposite side to the first lead wire and connecting between the specific coil and another one of the plurality of coils, wherein both the first lead wire and the second lead wire are led out from a space between a circumferentially-adjacent pair of the teeth, and the connection portion of the first lead wire is connected to the locking part that is located at a position out of the space between the circumferentially-adjacent pair of the teeth from which both the first lead wire and the second lead wire are led out.

2. The armature as set forth in claim 1, comprising the plurality of coils of a plurality of phases, wherein among the plurality of coils, the specific coil of a first one of the plurality of phases is located on a first circumferential side of the locking part, and a specific coil of a second one of the plurality of phases is located on a second circumferential side of the locking part, the connection portion of the first lead wire led out from the specific coil of the first phase is locked to the locking part that is located between the specific coil of the first phase and the specific coil of the second phase, and the first lead wire led out from the specific coil of the first phase and a second lead wire led out from the specific coil of the second phase are spaced apart from each other in an axial direction between the specific coil of the first phase and the specific coil of the second phase.

3. A rotating electric machine comprising a stator and a rotor, wherein one of the stator and the rotor includes the armature as set forth in claim 1, and the other of the stator and the rotor has a magnet arranged to radially face the armature.

4. An armature comprising:

an armature core having an annular part and a plurality of teeth protruding from the annular part toward a radial side thereof and spaced apart from one another in a circumferential direction;

a plurality of coils formed of electroconductive windings wound around the respective teeth;

a terminal formed of an electroconductive member and having a locking part arranged between a circumferentially-adjacent pair of the teeth;

a first lead wire formed of a part of one of the windings which forms a specific coil among the plurality of coils, the first lead wire being routed from the specific coil to the locking part and having a connection portion connected to the locking part;

a second lead wire formed of another part of the one of the windings which forms the specific coil, the second lead wire being routed from the specific coil to the first lead wire side and connecting between the specific coil and another one of the plurality of coils; and an insulator formed of an electrically-insulative material and mounted to the armature core, the insulator having a lead-wire contact portion against which at least one of the first and second lead wires abuts, thereby maintaining a state of the first and second lead wires being spaced apart from each other.

5. A rotating electric machine comprising a stator and a rotor, wherein one of the stator and the rotor includes the armature as set forth in claim 4, and the other of the stator and the rotor has a magnet arranged to radially face the armature.

* * * * *